(12) United States Patent
Hsu et al.

(10) Patent No.: US 11,347,275 B2
(45) Date of Patent: May 31, 2022

(54) PORTABLE ELECTRONIC APPARATUS WITH DISPLAY AND INPUT FUNCTIONS

(71) Applicant: HENGHAO TECHNOLOGY CO., LTD., Hsin-chu County (TW)

(72) Inventors: Chen-Chang Hsu, Taichung (TW); Yung-Chih Liu, Taichung (TW); Jhao-Siang Jiang, Taichung (TW)

(73) Assignee: HENGHAO TECHNOLOGY CO., LTD., Hsin-chu County (TW)

(*) Notice: Subject to any disclaimer, the term of this patent is extended or adjusted under 35 U.S.C. 154(b) by 7 days.

(21) Appl. No.: 17/026,320

(22) Filed: Sep. 21, 2020

(65) Prior Publication Data
US 2021/0216110 A1    Jul. 15, 2021

(30) Foreign Application Priority Data

Jan. 13, 2020    (TW) ................. 109101060

(51) Int. Cl.
*G06F 1/16*    (2006.01)

(52) U.S. Cl.
CPC .......... *G06F 1/1681* (2013.01); *G06F 1/1616* (2013.01)

(58) Field of Classification Search
None
See application file for complete search history.

(56) References Cited

U.S. PATENT DOCUMENTS

| | | | | |
|---|---|---|---|---|
| 6,437,973 B1 * | 8/2002 | Helot | ........ | G06F 1/1616 248/161 |
| 6,768,637 B1 * | 7/2004 | Amemiya | ....... | G06F 1/1632 361/679.27 |
| 7,273,089 B2 * | 9/2007 | Hata | ........ | G06F 1/1616 165/104.33 |
| 8,917,498 B2 * | 12/2014 | Mai | ........ | G06F 1/1683 361/679.02 |
| 9,146,590 B2 * | 9/2015 | Myers | ........ | H05K 7/06 |
| 9,189,016 B2 * | 11/2015 | Jang | ........ | G06F 1/1637 |
| 9,450,038 B2 * | 9/2016 | Kwon | ........ | H01L 29/78675 |
| 9,946,310 B1 * | 4/2018 | Huang | ........ | G06F 1/1641 |
| 2012/0314383 A1 * | 12/2012 | Oohira | ........ | G02F 1/13452 361/749 |
| 2013/0002133 A1 * | 1/2013 | Jin | ........ | H01L 51/0097 313/511 |
| 2014/0132488 A1 * | 5/2014 | Kim | ........ | G06F 1/1637 345/76 |
| 2014/0307380 A1 * | 10/2014 | Nakamura | ....... | G06F 1/1683 361/679.27 |

(Continued)

FOREIGN PATENT DOCUMENTS

TW    M600063 U    8/2020

*Primary Examiner* — Anthony Q Edwards
*Assistant Examiner* — Rashen E Morrison
(74) *Attorney, Agent, or Firm* — Winston Hsu

(57) ABSTRACT

A portable electronic apparatus comprises a first housing, a display panel, a shaft housing, a second housing, and a circuit board. The display panel is embedded in the first housing. The shaft housing is connected and fixed to a side of the first housing, and two ends of the shaft housing are hinged on a side of the second housing, such that the first housing is rotated with respect to the second housing through the shaft housing. The circuit board is disposed in the shaft housing and electrically connected to the display panel.

10 Claims, 6 Drawing Sheets

(56) References Cited

U.S. PATENT DOCUMENTS

2014/0320762 A1* 10/2014 Jeong ............... G06F 3/041
  445/24
2015/0331451 A1* 11/2015 Shin ............... G06F 1/1626
  345/173

* cited by examiner

PORTABLE ELECTRONIC APPARATUS WITH DISPLAY AND INPUT FUNCTIONS

CROSS REFERENCE TO RELATED APPLICATION

This application claims the benefit of Taiwan Patent Application Serial No. 109101060, filed Jan. 13, 2020, the entire content of which is incorporated herein by reference.

BACKGROUND OF THE INVENTION

1. Field of the Invention

The present invention relates to a portable electronic apparatus with display and input functions, in particular to a portable electronic apparatus with a circuit board disposed in a shaft housing.

2. Description of the Prior Art

With the rapid development of technology, portable electronic apparatus possess the advantages of light weight, thin thickness, low power consumption, and are widely used in many consumer electronic products, such as smart phones, tablet or laptop computers. Since the portable electronic apparatus are equipped with an input device for receiving the user input and a display device that allows the user to view images, it allows the user to perform electronic computing functions everywhere, thereby improving the convenience. However, in order to provide the user with a more comfortable visual experience, the demand for higher screen-to-body ratio (the ratio of the display area to the area of portable electronic apparatus) of the electronic apparatus is increasing. Nevertheless, the screen-to-body ratio of current portable electronic device is limited to the installation of the circuit board of the display device and cannot be increased. Therefore, to increase the screen-to-body ratio of portable electronic apparatus becomes one of the goals to be developed in this field.

SUMMARY OF THE INVENTION

One embodiment of the present invention provides a portable electronic apparatus, which includes a first housing, a display panel, a shaft housing, a second housing, and a circuit board. The display panel is embedded in the first housing. The shaft housing is connected and fixed to a side of the first housing. Two ends of the shaft housing are hinged on a side of the second housing, such that the first housing is rotated with respect to the second housing through the shaft housing. The circuit board is disposed in the shaft housing and electrically connected to the display panel.

In the portable electronic apparatus of the present invention, the circuit board is disposed in the shaft housing, such that the screen-to-body ratio of the portable electronic apparatus can be increased without increasing the thickness of the first housing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
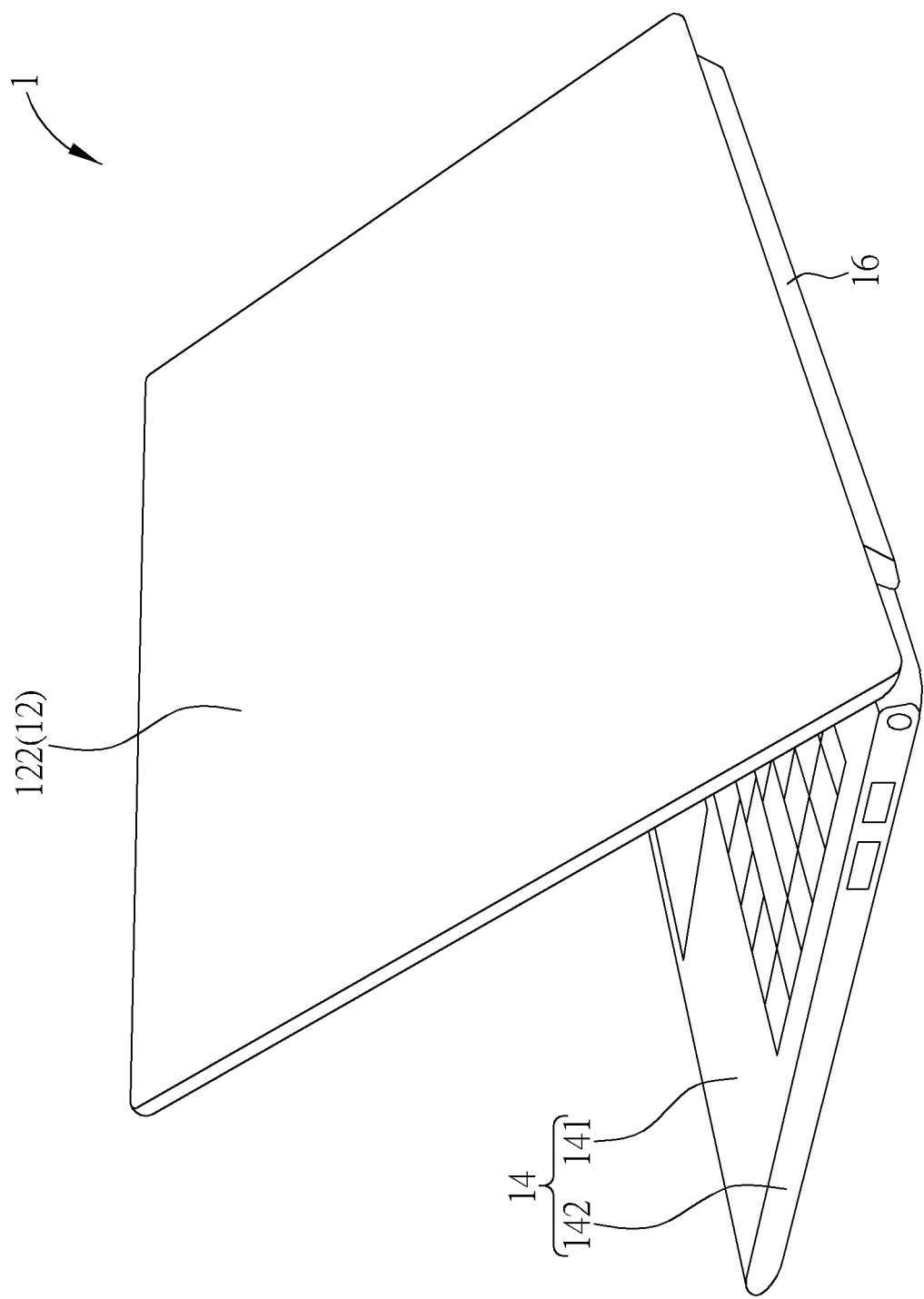
FIG. 1 depicts a schematic side view of a portable electronic apparatus viewed from its outer side according to an embodiment of the present invention.

The present invention will be described in detail below in combination with embodiments and drawings. In order to make the present invention more clear and easy to understand, the drawings below may be simplified schematic diagrams and the components thereof may not be drawn to actual scale. Moreover, the number and size of each component in the drawings are merely for illustration and are not intended to limit the scope of the invention.

Figure 2:
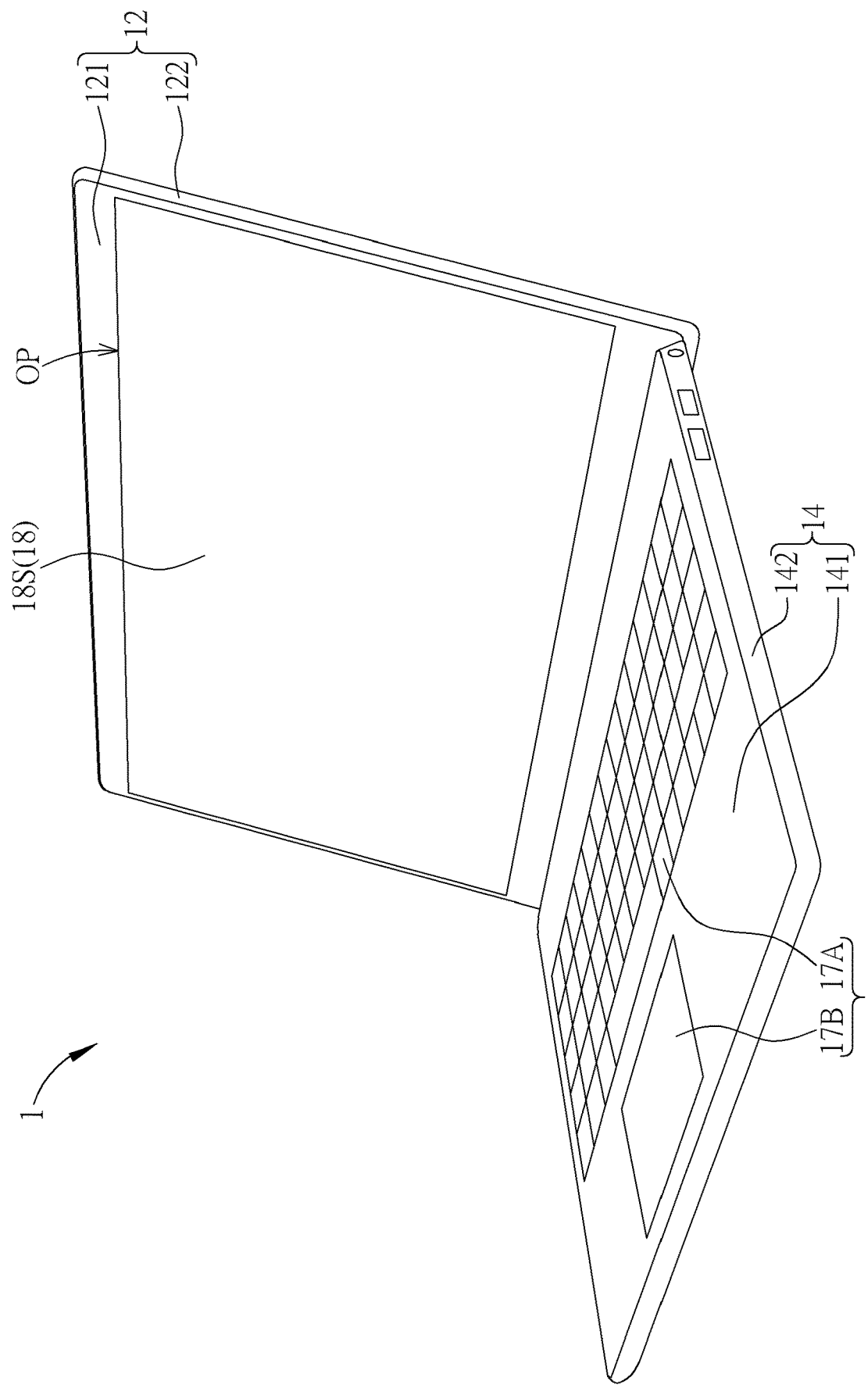
FIG. 2 depicts a schematic side view of a portable electronic apparatus viewed from its inner side according to the embodiment of the present invention.

The portable electronic apparatus of the present invention may include a laptop computer or other suitable foldable electronic apparatus, but it is not limited thereto. Hereinafter, a laptop computer is used as a portable electronic apparatus for illustrating the present invention, but the present invention is not limited thereto. FIG. 1 depicts a schematic side view of a portable electronic apparatus viewed from its outer side according to an embodiment of the present invention. FIG. 2 depicts a schematic side view of the portable electronic apparatus viewed from its inner side according to the embodiment of the present invention. As shown in FIG. 1 and FIG. 2, the portable electronic apparatus 1 may include a first housing 12, a second housing 14, a shaft housing 16, and a display panel 18, wherein the shaft housing 16 is connected and fixed to a side of the first housing 12, and two ends of the shaft housing 16 are hinged on a side of the second housing 14, such that the first housing 12 may be rotated with respect to the second housing 14 through the shaft housing 16. The display panel 18 may be embedded in the first housing 12, and the display panel 18 may have a display surface 18S for displaying images. Here, the display surface 18S refers to the surface of the region where the display panel 18 can display images, and therefore, the region of the display surface 18S may represent the display region of the display panel 18.

In some embodiments, the portable electronic apparatus 1 may further comprise an input component 17 embedded in the second housing 14. A user may perform electronic computing through the input component 17 and view the computing results through the display panel 18, but it is not limited thereto. For example, the input component 17 may comprise a keyboard 17A, a touch pad 17B, a combination thereof or other suitable components, but it is not limited thereto.

Figure 4:
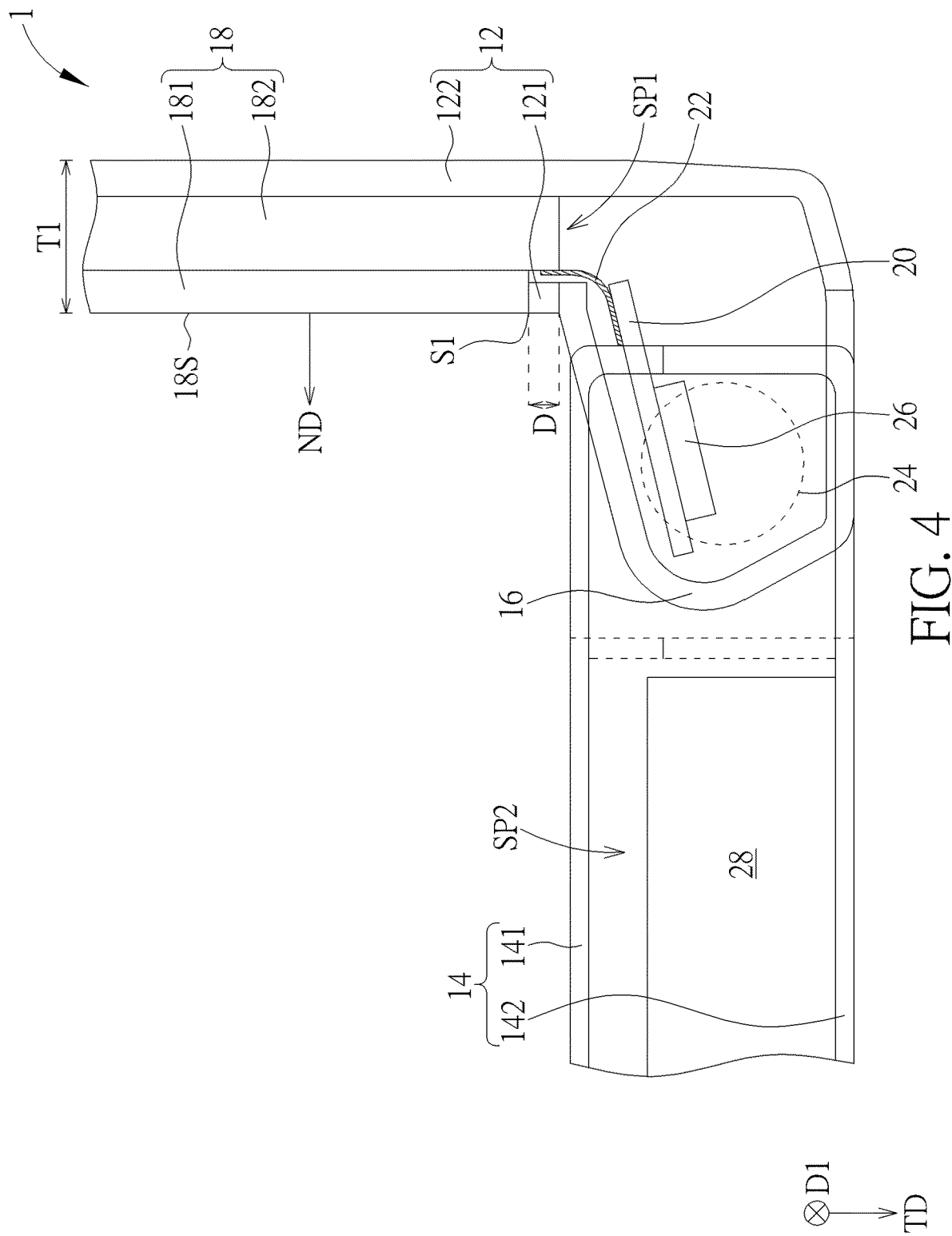
FIG. 4 depicts an enlarged schematic side view when the front cover is approximately perpendicular to the upper cover.

As shown in FIG. 1 and FIG. 2, according to one embodiment, the first housing 12 may comprise a front cover 121 and a back cover 122. The edge of the front cover 121 and the edge of the back cover 122 may be connected to each other, such that a first accommodating space SP1 may be formed between the front cover 121 and the back cover 122 (as shown in FIG. 4), and the display panel 18 may be disposed in the first accommodating space SP1. The front cover 121 may have an opening OP, so that the image displayed on the display surface 18S of the display panel 18 may be displayed through the opening OP. One side of the front cover 121 and one side of the back cover 122 may be connected to the shaft housing 16. The second housing 14 may comprise an upper cover 141 and a lower cover 142. The edge of the upper cover 141 and the edge of the lower cover 142 may be connected to each other, such that a second accommodating space SP2 may be formed between the upper cover 141 and the lower cover 142 (as shown in FIG. 4). The input component 17 may be embedded in the upper cover 141, but it is not limited thereto. Furthermore, the front cover 121 of the first housing 12 and the upper cover 141 of the second housing 14 may be rotated to face each other. In some embodiments, the back cover 122 of the first housing 12 may also be rotated to face the lower cover 142 of the second housing 14. The front cover 121, the back cover 122, the upper cover 141, the lower cover 142, and the shaft housing 16 may comprise hard material to protect the components disposed therein. For example, the hard material may include metal, plastic or other suitable material. In some embodiments, the shaft housing 16, the front cover 121 and the back cover 122 may be individually formed. In some embodiments, the back cover 122 and the shaft housing 16 may be integrally formed. In some embodiments, the front cover 121 and the shaft housing 16 may be integrally formed.

Figure 3:
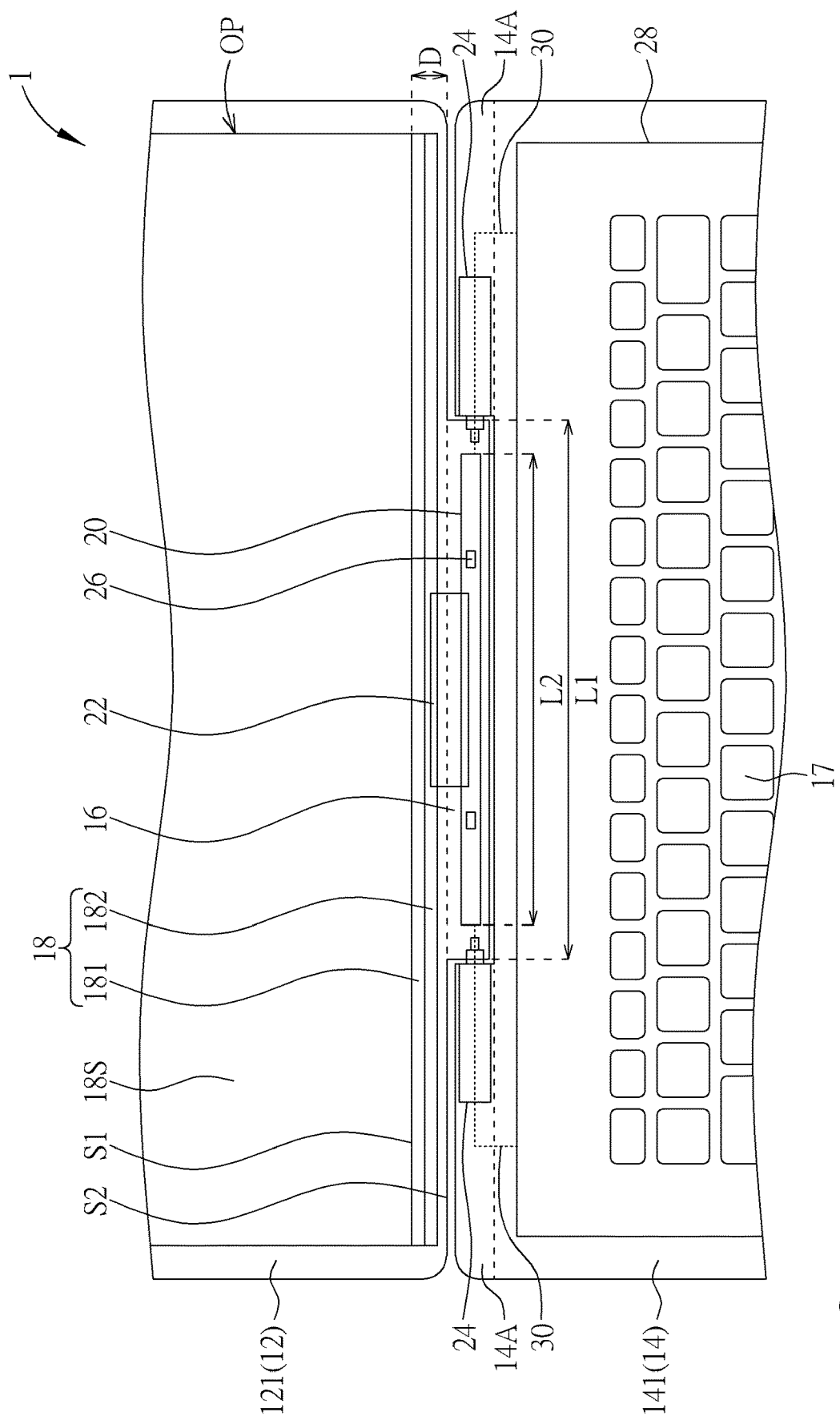
FIG. 3 depicts an enlarged perspective schematic view of a portable electronic apparatus when a front cover of a first housing is opened from an upper cover of a second housing.

Referring to FIG. 3 and FIG. 4, FIG. 3 depicts an enlarged perspective schematic view of the portable electronic apparatus when the front cover of the first housing is opened from the upper cover of the second housing. FIG. 4 depicts an enlarged schematic side view when the front cover is approximately perpendicular to the upper cover. As shown in FIGS. 3 and 4, the portable electronic apparatus 1 may further comprise at least one circuit board 20 disposed in the shaft housing 16 and electrically connected to the display panel 18. In one embodiment, the shaft housing 16 may not overlap with the front cover 121 in a normal direction ND of the display surface 18S of the display panel 18. By taking advantage of the design of the shaft housing 16 and the design of disposing the circuit board 20 in the shaft housing 16, there is no need to dispose the circuit board 20 between the display panel 18 and a side S2 of the front cover 121 adjacent to the second housing 14. Therefore, the distance between the display panel 18 and the side S2 of the front cover 121 adjacent to the second housing 14 can be reduced, thereby reducing the distance D from a side S1 of the display surface 18S to the side S2 of the front cover 121 (that is, a width of the lower frame portion of the front cover 121), and thus increasing the screen-to-body ratio (that is, the ratio of the area of the display surface 18S to the area of the front cover 121) of the portable electronic apparatus 1. Moreover, since the circuit board 20 is disposed in the shaft housing 16 instead of being bent between the display panel 18 and the back cover 122, a thickness T1 of the first housing 12 will not be increased due to the disposition of the circuit board 20. FIG. 3 and FIG. 4 merely depict a single circuit board 20, while the present invention is not limited thereto. In some embodiments, the portable electronic apparatus 1 may further comprise a plurality of circuit boards 20 disposed in the shaft housing 16.

In an embodiment, the circuit board 20 may be a control circuit board for controlling the display panel 18. For example, the circuit board 20 may be a rigid printed circuit board. In this case, the portable electronic apparatus 1 may further comprise a flexible circuit board 22 electrically connecting the display panel 18 to the circuit board 20. Due to the flexibility of the flexible circuit board 22, the circuit board 20 may be arranged in the shaft housing 16 by bending the flexible circuit board 22. In some embodiments, the circuit board 20 may also be a control circuit board for controlling a touch panel. In some embodiments, the flexible circuit board 22 may comprise a plurality of wires (not shown) arranged alongside one another, but it is not limited thereto. The number of flexible circuit board 22 is not limited to what is shown in FIG. 3 and FIG. 4, and may be adjusted according to actual circumstances. In some embodiments, the circuit board 20 may be a flexible circuit board that is directly connected to the display panel 18, and in this case, the portable electronic apparatus 1 may not further comprise the flexible circuit board 22.

Figure 5:
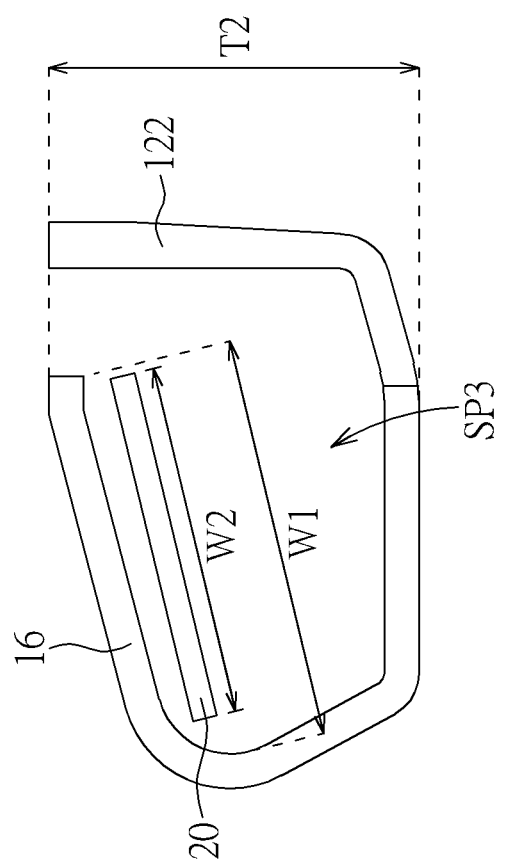
FIG. 5 depicts an enlarged schematic cross-sectional view of a shaft housing and a circuit board.

Referring further to FIG. 5, FIG. 5 depicts an enlarged schematic cross-sectional view of the shaft housing and the circuit board. In order to clearly show the relationship among the shaft housing, a portion of the back cover and the circuit board, FIG. 5 only shows the shaft housing, the portion of the back cover, the circuit board and ignores other components, while the present invention is not limited thereto. As shown in FIG. 4 and FIG. 5, the shaft housing 16 and a portion of the back cover 122 without overlapping with the front cover 121 in the normal direction ND of the display surface 18S of the display panel 18 may form a third accommodating space SP3, so as to accommodate the circuit board 20. For example, a maximum width W1 of the third accommodating space SP3 in the cross-sectional direction (such as the direction perpendicular to the side S2 of the front cover 121 shown in FIG. 3) may be greater than a width W2 of the circuit board 20 extending toward the second housing 14, such that the circuit board 20 may be disposed in the shaft housing 16. In some embodiments, when the first housing 12 is rotated until the display surface 18S of the display panel 18 is approximately perpendicular to the upper surface of the upper cover 141, a thickness T2 of the shaft housing 16 in a direction perpendicular to the upper surface of the upper cover 141 (such as the top view direction TD) may be smaller than the width W2 of the circuit board 20. In some embodiments, the shaft housing 16 may not overlap with the display panel 18 in the normal direction ND of the display surface 18S of the display panel 18. In some embodiments, the display panel 18 may also extend into the third accommodating space SP3.

Referring again to FIG. 3, in an embodiment, the portable electronic apparatus 1 may further comprise two shaft structures 24 disposed respectively at the two ends of the shaft housing 16 and connected to the second housing 14. For example, the second housing 14 may comprise two protrusions 14A extend respectively to the outer side of the two ends of the shaft housing 16, and one of the shaft structures 24 links the corresponding protrusion 14A and one end of the corresponding shaft housing 16. Therefore, the shaft housing 16 and the first housing 12 may be rotated with respect to the second housing 14 through the shaft structures 24. Since a portion of one of the shaft structures 24 extending into the shaft housing 16 is smaller than a length L1 of the shaft housing 16 in the direction along the side S2 of the front cover 121 (such as the direction D1), the shaft housing 16 may further accommodate the circuit board 20. For example, a length L2 of the circuit board 20 in the direction D1 is smaller than the length L1 of the shaft housing 16 in the direction D1. In some embodiments, the circuit board 20 may be disposed between the shaft structures 24.

In some embodiments, as shown in FIG. 3 and FIG. 4, the portable electronic apparatus 1 may, for example, comprise at least one control chip 26 disposed on the circuit board 20 for controlling the display panel 18. For example, the control chip 26 may be disposed on the surface of the circuit board 20 opposite to the flexible circuit board 22, but it is not limited thereto. The number of the control chip 26 may be at least one, and may be adjusted according to actual circumstances. In some embodiments, the control chip 26 may comprise a display panel control chip, a touch panel control chip, a display and touch integrated chip, or other suitable chips. In some embodiments, other components may be further disposed on the circuit board 20, for example, passive components such as capacitors or resistors, but it is not limited thereto. In some embodiments, the control chip 26 may not be disposed on the circuit board 20, and the circuit board 20 may be used to electrically connect the display panel 18 to the control chip 26.

In the embodiment shown in FIG. 3 and FIG. 4, the display panel 18 is a liquid crystal display panel as an example, so it may comprise a color filter substrate 181 and a thin film transistor substrate 182, and a liquid crystal layer (not shown) is disposed between the color filter substrate 181 and the thin film transistor substrate 182, but it is not limited thereto. In some embodiments, one end of the flexible circuit board 22 may be adhered to the surface of the thin film transistor substrate 182 facing the color filter substrate 181 and electrically connected to the thin film transistor substrate 182. In some embodiments, the display panel 18 may be other non-self-luminous display panels or self-luminous display panels.

As shown in FIGS. 3 and 4, the portable electronic apparatus 1 may further comprise a host 28 disposed in the second accommodating space SP2 between the upper cover 141 and the lower cover 142. The host 28 can be used to control the input component 17. In some embodiments, the portable electronic apparatus 1 may further comprise wires 30 electrically connected to the circuit board 20. For example, the wires 30 may be elongated wires, such that one end of one of the wires 30 may be connected to the host 28, and the wire 30 may pass through the shaft structure 24 such that the other end of the wire 30 is connected to the circuit board 20. In this case, the host 28 may control the display panel 18 through the circuit board 20. The number of wires 30 is not limited to what is shown in FIG. 3, and may be adjusted according to actual circumstances. In some embodiments, the host 28 may execute instructions requested by the user. In some embodiments, the host 28 may comprise a motherboard, a central processing unit, a memory, or other suitable components.

Figure 6:
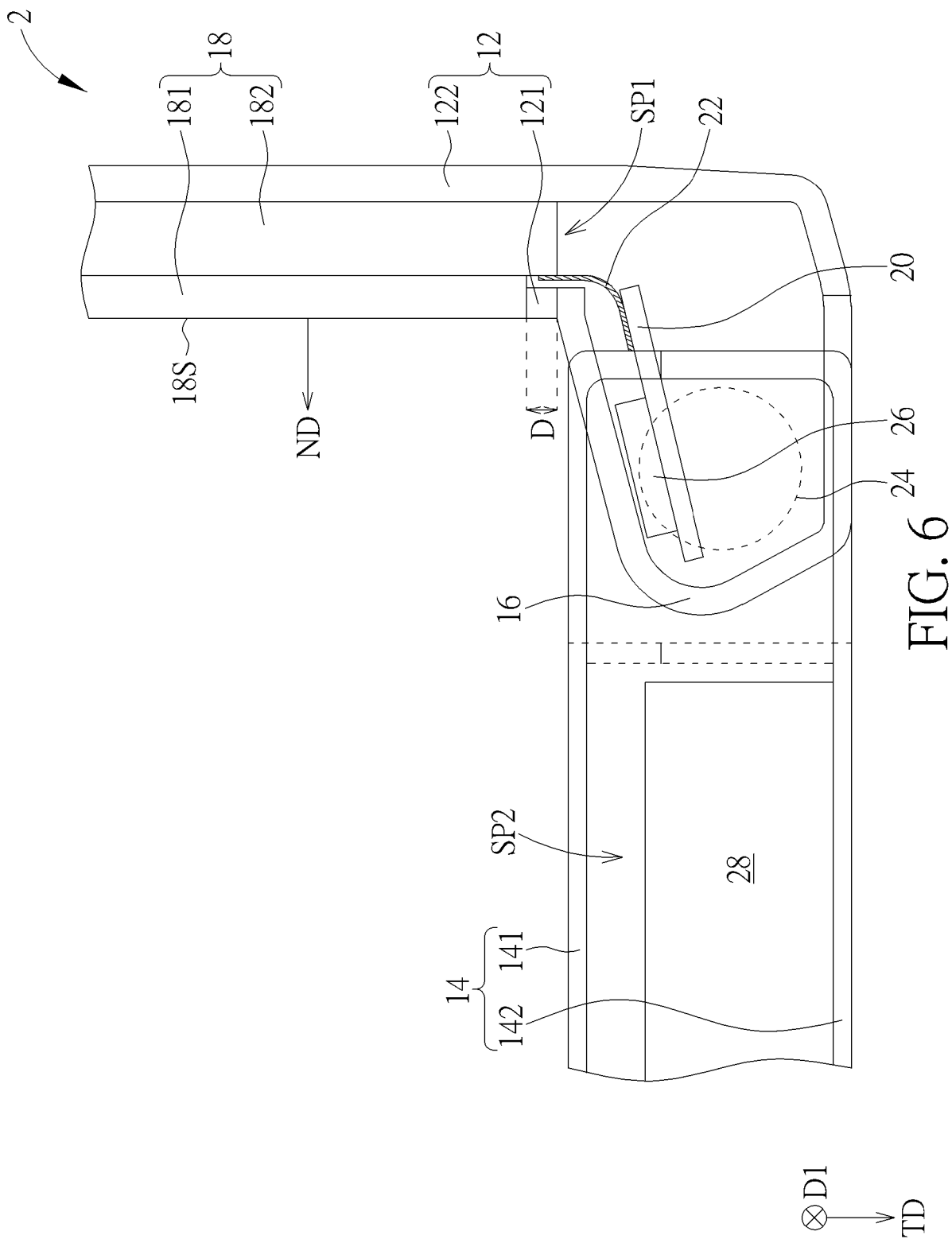
FIG. 6 depicts an enlarged schematic side view of a portable electronic apparatus according to another embodiment of the present invention.

The portable electronic apparatus of the present invention is not limited to the foregoing embodiment. FIG. 6 depicts an enlarged schematic side view of a portable electronic apparatus according to another embodiment of the present invention. The difference between the portable electronic apparatus 2 of this embodiment and the above embodiment is that the control chip 26 may be disposed on the surface of the circuit board 20 facing the flexible circuit board 22, and the control chip 26 may be separated from the flexible circuit board 22.

In summary, according to the portable electronic apparatus of the present invention, the circuit board is disposed in the shaft housing, and therefore, the distance between the display panel and the side of the front cover adjacent to the second housing can be reduced, thereby reducing the width of the lower frame portion of the front cover, and thus increasing the screen-to-body ratio of the portable electronic apparatus. Moreover, the thickness of the first housing does not increase due to the disposition of the circuit board.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic apparatus, comprising:
a first housing;
a display panel embedded in the first housing;
a shaft housing connected and fixed to a side of the first housing;
a second housing, wherein two ends of the shaft housing are hinged on a side of the second housing, such that the first housing is rotated with respect to the second housing through the shaft housing;
two shaft structures disposed respectively at the two ends of the shaft housing and connected to the second housing; and
at least one circuit board disposed in the shaft housing and electrically connected to the display panel, wherein the at least one circuit board overlaps the shaft structures along an extending direction of one of the shaft structures.

2. The portable electronic apparatus according to claim 1, wherein the first housing comprises a front cover and a back cover, the front cover and the back cover form a first accommodating space, and the display panel is disposed in the first accommodating space.

3. The portable electronic apparatus according to claim 1, wherein the shaft housing does not overlap with the display panel in a normal direction of a display surface of the display panel.

4. The portable electronic apparatus according to claim 1, further comprising an input component embedded in the second housing.

5. The portable electronic apparatus according to claim 4, wherein the second housing comprises an upper cover and a lower cover, and the input component is embedded in the upper cover.

6. The portable electronic apparatus according to claim 4, wherein the input component comprises a keyboard.

7. The portable electronic apparatus according to claim 1, wherein the at least one circuit board is disposed between the shaft structures.

8. The portable electronic apparatus according to claim 1, wherein a length of the at least one circuit board in a direction is shorter than a length of the shaft housing in the direction.

9. The portable electronic apparatus according to claim 1, further comprising a flexible circuit board electrically connecting the display panel to the at least one circuit board.

10. The portable electronic apparatus according to claim 1, wherein the circuit board is a rigid printed circuit board.

* * * * *